Patented Sept. 17, 1935

2,014,798

UNITED STATES PATENT OFFICE 2,014,798

MANUFACTURE OF REFINED SAGO STARCH

Arthur D. Fuller, New Rochelle, N. Y., assignor to National Adhesives Corporation, New York, N. Y., a corporation of Delaware No Drawing. Application November 17, 1932, Serial No. 643,054

10 Claims. (Cl. 127—71)

This invention relates to the manufacture from crude sago flour of a refined sago starch product.

Crude sago is a dark colored (brownish-pink) flour containing many small lumps which readily pack or coalesce, rendering the flour non-free-flowing, and containing impurities such as fiber, bark, sand and dirt. Crude sago has been used in the manufacture of explosives as a source of carbohydrate and for the making of sizes where its crudeness was no objection. Where finer work was required, the crude sago was bolted in a dry state to remove such impurities as could be removed thereby, the sifters produced being known as "dressed sago"; so far as I am aware, sago flour has never been refined or purified beyond that of the making of this "dressed sago".

The prime object of the present invention centers about the manufacture from crude sago flour of a refined sago product, pure white in color, substantially free of all its insoluble and soluble impurities, free from all lumps, and which may be ground into a very fine free-flowing powder, the refined sago starch product being capable of many uses in the arts.

The present application is a continuation in part of my copending application Serial No. 506,735 to Method of manufacturing modified starches, etc., filed Jan. 5, 1931, now Patent 1,942,544.

The manufacture of the present invention is practiced in steps or stages as follows:

(a) *Chlorination.*—The sago flour in suspension in water at any convenient density is treated with a chlorine containing body such as a preferably alkaline calcium hypochlorite solution, the treatment being carried out so as to effect a reaction between the starch material and the available chlorine. This first operation for convenience will be referred to as chlorination, although other effects are produced such as the following: decolorization or bleaching of the starch material, leaving the starch pure white; a solvent and destructive action on the impurities whereby the soluble impurities may be washed out and the removal of insoluble impurities such as fibrous material and the like facilitated by passing the starch through silk screens without excessive starch losses; chlorination of the starch material, by which is intended a chemical reaction between the available chlorine and the starch material, as evidenced by the facts that the starch so treated retains the chlorine when heated, the ash content of the treated starch is substantially increased and the alkaline fluidity thereof is substantially increased although its water fluidity is not materially altered; and oxidation of the starch to some extent.

This treatment of the starch with calcium hypochlorite preferably in an alkaline medium, or with an equivalent alkaline chlorine containing body, may be carried out at room temperature but is preferably performed at somewhat elevated temperatures substantially lower, however, than the gelatinizing temperature of the starch. The hypochlorite is introduced into the starch "milk" or suspension a little at a time over a considerable period of time, and the magma is kept in agitation, preferably, until the available chlorine is completely absorbed, that is, until the chlorine in any form capable of reacting with the starch material is all taken up by the starch. The amount of chlorine thus absorbed may vary from ¼ of 1 per cent on the dry basis weight of the starch. For producing a low chlorination product, the preferable amount of chlorine absorbed is about ½ of 1 per cent, and for producing a high chlorination product, the preferable amount of chlorine absorbed is from 1 per cent to 6 per cent. The hypochlorite should be a clear solution free from sludge. Preferably the material at the chlorination stage has a pH value of from 6.0 to 7.0 or even a little on the alkaline side.

(b) *Screening.*—Crude sago flour is peculiarly liable to clot when mixed with water, due to the fact that the starch particles are adhered together by the impurities present. The chlorination treatment dissolves the binder and frees the starch material so that it can pass in the form of a starch milk through a silk screen, leaving the insoluble impurities behind. The action of the hypochlorite further is to render certain insoluble impurities soluble by some chemical change either of a hydrolytic or oxidation character or both, and in this soluble form these impurities can be more readily disposed of. In addition to these two actions, the chlorination treatment so acts upon the sago starch material itself as to permit the same to readily pass through the silk screen, the untreated sago flour being of such a character that even if the lumps were screened out, the starch material would not readily pass through the silk screen (without chlorination).

After the starch milk is allowed to react under normal agitation (sufficient to keep the starch from settling out) for the desired time period to allow the available chlorine to be completely absorbed by the starch, the starch milk is then pumped over a silk shaker screen of the standard type covered, for example, with a #12 XX silk. In this operation, the starch milk is cleansed of the insoluble impurities, which consist of fiber, sand, dirt and bark.

(c) *Dewatering and washing.*—The starch milk is then dewatered and washed by passing the same preferably through filter presses, and desirably through filters of the vacuum type. Here warm water sprays are preferably used to facilitate the removal of soluble impurities, those originally in the starch and those resulting from the chlorination treatment. The removal of these impurities is of especial importance where the final starch product is desired to be dextrinized, since these impurities have a buffer action on the acid or other catalyzer in the dextrinizing treatment. The available chlorine having been absorbed by and reacted with the starch material, there is substantially no loss of the active chlorine reagent in this dewatering and washing stage. With low chlorinating treatment there is substantially no hydrolyzing action on the starch material and therefore there is substantially no loss of the starch product in this dewatering and washing stage. The washing is particularly feasible if the pH of the starch magma is at or near the neutral point.

By the operations thus far described, a high degree of refining is obtained without any excessive starch losses.

(d) *Adjustment of pH.*—The filter cake coming from the filter press is then again made up into a milk, and the pH value of the starch milk is adjusted for the particular product which it is desired to be manufactured. To produce the refined sago starch product, the pH is adjusted to approximately 5.5, this being selected because it approximates the pH of well washed highly purified starch. However, the pH may be varied within such limits that there is neither any appreciable conversion in the subsequent operations due to too low pH nor darkening of the starch due to too high pH. The adjusted starch milk is then refiltered using water sprays if the pH value is near the neutral point or without the use of water sprays where altering of the hydrogen ion concentration is desired to be avoided. Any suitable hydrolyzing acid, for example hydrochloric acid, may be used for lowering the pH, and any suitable basic substance, such for example as lime, may be employed for raising the pH value of the starch milk.

(e) *Drying.*—The pH adjusted and filtered starch cake is then dried. Any method of drying at low temperatures, such as rotary driers or vacuum driers may be used, a preferred method consisting in transferring the cake to trays, placing the same on wagons, and conveying the wagons through tunnels where the cakes are dried by the medium of a current of warm air, the tunnel entrant temperatures of which is around 150° F. The dried cake is then removed from the trays, broken up and ground if required, and is then bagged.

The following are specific examples of the application of the invention to the production of the particular products:

*Example I—Low chlorination product*

Sago flour in the form of a starch milk at a density of 15° Baumé more or less, is preferably heated to about 100° to 120° F. Then a 3 per cent solution of an alkaline calcium hypochlorite is added to the milk in an amount equivalent to ½ per cent of available chlorine on the dry basis weight of the raw starch. Sodium, potassium or magnesium hypochlorite may also be used. Agitation is continued for three or four hours until the starch milk tested for available chlorine shows either none or only a trace present. The chlorinated milk is then run over a silk shaker screen and the fibers and other foreign materials such as bark, bag lint, chips of wood, sand and dirt are removed. The milk is then dewatered and washed on an American filter using warm water sprays. The filter cake obtained is then broken up in warm water, the pH adjusted to approximately 5.5, and then refiltered using water sprays. The pH may be varied, however, within such limits that there is neither any appreciable subsequent conversion due to a too low pH nor a darkening of the starch due to a too high pH. The re-filtered cake is then transferred to trays, placed on wagons and dried in tunnels by the medium of a current of warm air, the tunnel entrant temperature of which is about 150° F. The dried cake is thereafter removed from the trays, broken up (ground if required) and bagged.

The hypochlorite solution used is previously prepared by passing chlorine gas into a deep tank containing lime water and adjusted so that there are thirty grams available chlorine per liter of solution. The clear solution is decanted or siphoned off from the sludge and is thereafter carefully standardized by titration after reduction so that ten c. c. of the solution require two c. c. of tenth normal sulphuric acid to bring to neutrality to phenolphthalein. The starch or flour will ordinarily be acid, and the hypochlorite solution should be sufficiently alkaline to give the mixture a pH value of about 6.0 to 7.0. The solution should be added slowly; for example, the operation may require one-half to one hour; and after the hypochlorite is completely added, the starch milk is further agitated until the absorption of the available chlorine is complete as above described. The absorption may require three to four hours.

The resulting product obtained is a pure white reaction starch product freed of fiber, dirt and sand, and characterized by being a fine slippery powder when ground, the slip approximating that of talcum powder. The fluidity of this starch reaction product when cooked with water is not materially different (being about 20% greater) than that of the raw or unreacted sago flour. I have found, however, that the fluidity of the starch reaction product when dissolved in a dilute caustic soda solution of about 1 per cent, is substantially (several times) greater than the fluidity in such dilute caustic soda solution of the raw or unreacted sago flour. For example, the caustic fluidity of this obtained sago starch product is about seven times as great as that of the caustic fluidity of the untreated sago. When very pure varieties of corn, potato and tapioca starches are dissolved in this same amount of dilute alkali under the same conditions, very viscous liquid bodies are produced which are markedly different in their properties and characteristics than the sago reaction product; the pure starches are so viscous under these conditions that they either will not flow at all from the orifice which measures the fluidity, or will drip through in an amount approximately one or two cc's in the allotted time against 60 to 70 cc's for the sago reaction product, the viscous bodies of the pure starches being further characterized by exceptional cohesiveness and a rubbery condition instead of being free-flowing as the sago product.

Where a sago starch reaction product having a greater water fluidity is desired (thin boiling characteristic), then the above process is so carried out that the pH of the starch milk prior to drying is adjusted to lower values, as for example to 4.5 (by the addition for example of hydrochloric acid).

*Example II—High chlorination product*

Raw sago flour in the form of a starch milk at a density of 15° Baumé more or less is preferably warmed, the temperature being, however, kept low and not being permitted to go over 100° F. The hypochlorite solution previously prepared is then added to the milk, in small portions, until from 1 per cent to 6 per cent available chlorine on the dry basis weight of the flour is absorbed, the solution being added so that each portion is allowed to be substantially absorbed before the next portion is added. The pH of the chlorinated milk should be maintained close to 7.0, this being accomplished by the continuous addition of an alkali such as calcium hydroxide. The addition of this alkali compensates for the drop in the pH value of the milk due to the chlorinating reaction. When the alkaline calcium hypochlorite solution is added, a rise in temperature ensues (indicating the presence of a chemical reaction) and the pH value of the milk drops (indicating the formation of acid groups). In all probability this acid reaction is due to an aldehyde grouping in the starch molecule being oxidized to a carboxyl group. Furthermore, the continued additions of alkali cause formation of a metallic salt of the carboxylic acid, which salt is insoluble in water. Such a reaction would also explain the presence of a high ash content in the end product hereinbelow described, which ash content cannot be removed by even prolonged washing of the starch. The lowering of the pH below the value of 6.0 to 7.0 is desired to be avoided, for the reasons that if the hypochlorite (in increasing amounts) is added to the starch suspensoid under a condition where the pH is too low, the odor of free chlorine is immediately noticeable, signifying a loss of some of the active reagent, and that when the starch suspensoid is at a pH of between 6.0 and 7.0 or even a trifle higher, it is in a more favorable condition to undergo the incipient reaction that takes place than at lower pH values. After chlorination the starch milk is processed by screening, dewatering and washing, adjustment of the pH and drying, as in Example I.

The refined sago starch reaction product obtained in this example is also a pure white starch product, free of fiber and its other insoluble as well as soluble impurities, characterized by being a fine slippery powder when ground. With high chlorination, a better uniformity in the end product may be obtained, since the same is definitely determined before the drying step. Another advantage in high chlorination as compared to the low chlorination method (with addition of acid to produce increased fluidity) is that with low chlorination the product tends to become opaque and pasty on cooling, whereas with high chlorination the product maintains a colloidal homogeneity, with the result that it has a better penetrating power when used for sizing and also possesses greater adhesive strength; this characteristic of colloidal homogeneity is an indication of the ability of this product to form continuous films upon drying. The clarity of the chlorinated starch is much more pronounced (than acid treated starches) in proportion to the amount of hypochlorite used; the acid treated starches are characterized by being white and turbid in appearance, whereas the highly chlorinated starches are brilliant and clear when hot, and fairly translucent when cold.

I have found that the ash content of the starch reaction products obtained is substantially greater than that of pure high-grade commercial starches made from corn, potato, tapioca etc. The exact increase in ash content depends upon the amount of calcium hypochlorite used in the process together with the accompanying alkali added along with the hypochlorite (to maintain the proper pH). While the approximate ash content of a good grade of commercially pure starch will run about $\frac{1}{10}$ of 1 per cent, I have found that the ash of starch chlorinated by my process will run approximately $\frac{1}{4}\%$ when I use $\frac{1}{2}\%$ of calcium hypochlorite,—about $\frac{1}{2}\%$ when 2% of calcium hypochlorite is used—and about $\frac{3}{4}\%$ when 3% of calcium hypochlorite is used. Therefore while the starch ash increases with the amount of calcium hypochlorite employed, it is obvious that the increase is not proportionate, indicating that in addition to the calcium amylophosphate produced there is also probably another insoluble compound in the starch ash which is independent of the phosphoric acid in the amylopectin.

In order to free the starch from any free calcium hydroxide which may be in the magma, hydrochloric acid may be added until the pH is 3.0, agitation continued for several hours, and the magma dewatered over the American filter. The ash content of the starch is materially reduced by this acid treatment; this removal of ash is important if the final product is to be used in conjunction with borax in the manufacture of an adhesive, since otherwise, a precipitate (calcium borate in part) is formed. It has been also found that the color of the borated product is much lighter and brighter if the starch after chlorination and before acidification is treated with hydrogen peroxide. The nature of this reaction is unkown, but it is possible among other things that it oxidizes traces of any ferrous salts to the ferric condition, which in the presence of alkalis such as borax are not objectionable in color. The amount of peroxide used may vary, but $\frac{1}{2}\%$ (on the starch) of a commercial 30% solution has been found to give good results. Instead of hydrogen peroxide, any per-salts such as per-sulphate, sodium peroxide, barium peroxide or other peroxides may be used.

The refining of raw or crude sago flour, following either of the above examples, results in the production of a decolored highly purified sago starch reaction product which may be ground to a fine dry free-flowing powder capable of many uses. It is possible to produce products of varying degrees of fluidity by varying the amount of reagent used in the manner outlined above. In the dry state, the product is applicable for dusting processes where a dry slippery powder is required. In the wet state it lends itself admirably to sizing operations either for warps or for finishing. The sago product with suitable fluidity grade, imparts more strength to the warp threads (so that they will resist abrasion better) than the commercial fluidity starches used for that purpose. In finishing processes the sago reaction starch product, by reason of its greater penetrating properties, is capable of imparting a superior finishing to the threads or fabric or whatever is being coated. When the sago starch reaction product is dextrinized in accordance with the method set forth in my aforesaid parent application Serial No. 506,735, the products produced are characterized by a degree of freedom from impurities, a brightness, a clarity in solution and a brilliancy that attend only the highest grade gums made from the highest grade potato and tapioca starches. The process of the invention described herein is from many aspects also applicable to the refining of low grade tapioca starch having a relatively large proportion of fiber and albuminous material.

While I have herein set forth the preferred modes of practicing the invention, it will be understood that many changes may be made in the sequence of steps in the process and the proportions of the reagents without departing from the spirit of the invention, defined in the following claims.

I claim:

1. The method of refining sago flour which consists in reacting sago flour "milk" with a chlorine containing body until from 1% up of available chlorine on the dry basis weight of the flour is absorbed thereby and reacted therewith, in adding an alkali to the "milk" to compensate for the drop in the pH value thereof due to the chlorinating reaction, in removing the insoluble and soluble impurities from the reaction starch magma and in drying the resulting decolored and defibred sago starch product.

2. The method of refining crude flour or starch which consists in slowly reacting starch "milk" with a chlorine containing body until a high amount as from 1% up to 6% of available chlorine on the dry basis weight of the starch is absorbed thereby and reacted therewith, in continually adding an alkali to the "milk" to compensate for the drop in the pH value thereof due to the chlorinating reaction, in removing the insoluble and soluble impurities from the reaction starch magma and in drying the resulting decolored and defibred sago starch product.

3. The steps in the method of refining a crude starch material which consist in slowly adding to crude starch "milk" a chlorine containing body until a high amount as from 1% up of available chlorine on the dry basis weight of the starch is absorbed thereby and reacted therewith, and in adding an alkali to the "milk" to compensate for the drop in the pH value thereof due to the chlorinating reaction.

4. The method of making a refined sago starch reaction product from sago flour which consists in reacting sago flour "milk" with an alkaline hypochlorite substantially wholly soluble in water until chlorine of from ¼ of 1% to about 6% on the dry basis weight of the starch is absorbed by the flour, carrying out the reaction so that the chlorination dissolves the binder to mechanically free the starch material from the fibrous and like impurities in the flour and so that a reaction product of the flour and chlorine is produced, thereafter mechanically separating the fibrous and like impurities from the obtained reaction product, washing out the soluble impurities therefrom, adjusting the pH of the starch reaction product and then drying the product.

5. The method of making a refined sago starch reaction product from sago flour which consists in reacting sago flour in "milk" form with a chlorine containing body until chlorine greater than 1% on the dry basis weight of the starch is absorbed by the flour, carrying out the reaction so that the chlorination dissolves the binder to mechanically free the starch material from the fibrous and like impurities in the flour and so that a reaction product of the flour and chlorine is produced, thereafter passing the starch magma through screens for mechanically separating the fibrous and like impurities from the obtained reaction product, and washing out the soluble impurities therefrom.

6. A new product of manufacture, comprising a sago starch reaction product, said product consisting of a decolored, chlorinated sago starch material, freed of insoluble impurities such as fibre, dirt and sand, and characterized by having reacted therewith chlorine of from ¼ of 1% to 6% on the dry basis weight of the starch, the said starch reaction product having a pH value near the neutral point.

7. A new product of manufacture, comprising a refined sago starch reaction product, said product consisting of a decolored, chlorinated sago starch material, freed of insoluble impurities such as fibre, dirt and sand, and characterized by having reacted therewith chlorine greater than 1% on the dry basis weight of the starch.

8. A new product of manufacture, comprising a sago starch reaction product, said product consisting of a decolored, chlorinated starch material, freed of insoluble impurities such as fibre, dirt and sand, and characterized by having reacted therewith chlorine greater than 1% on the dry basis weight of the starch, the said starch reaction product having a pH value near the neutral point.

9. The method of making a refined sago starch reaction product from sago flour which consists in reacting sago flour in "milk" form with a chlorine containing body until chlorine of from ¼ of 1% to about 6% on the dry basis weight of the starch is absorbed by the flour, carrying out the reaction so that the chlorination dissolves the binder to mechanically free the starch material from the fibrous and like insoluble impurities in the flour and so that a reaction product of the flour and the chlorine is produced, in effecting the chlorination so that the chlorinated product has a pH value near the neutral point, thereafter passing the starch magma through screens for separating the fibrous and like impurities from the obtained reaction product and washing the soluble impurities therefrom.

10. The method of making a refined sago starch reaction product from sago flour which consists in reacting sago flour in "milk" form with a chlorine containing body until chlorine of from ¼ of 1% up, based on the dry weight of the starch is absorbed by the flour, carrying out the reaction so that the chlorination dissolves the binder to mechanically free the starch material from the fibrous and like impurities in the flour and so that a reaction product of the flour and the chlorine is produced, separating the fibrous and like impurities from the obtained reaction product and washing out the soluble impurities therefrom.

ARTHUR D. FULLER.